United States Patent

Borden et al.

[11] Patent Number: 5,851,631
[45] Date of Patent: Dec. 22, 1998

[54] COMPOSITE INFRARED WINDOWS USING SILICON AND PLASTIC

[75] Inventors: Michael R. Borden, Santa Monica; Herbert C. Bitting, Rolling Hills Estates; Christopher D. Taylor; Jeanette Lurier, both of Redondo Beach, all of Calif.

[73] Assignee: Raytheon Company, El Segundo, Calif.

[21] Appl. No.: 569,536

[22] Filed: Dec. 8, 1995

[51] Int. Cl.⁶ .................................. B32B 3/00; G02B 1/10
[52] U.S. Cl. ........................... 428/156; 428/34; 428/172; 428/337; 428/339; 428/446; 52/786.1; 359/585; 359/586
[58] Field of Search ............................. 428/34, 446, 451, 428/337, 339, 428, 911, 156, 172; 359/585, 586; 257/436, 437, 680; 52/204.7, 786.1, 788.1, 796.1, 800.1, 800.14; 244/3.16

[56] References Cited

U.S. PATENT DOCUMENTS

| | | | |
|---|---|---|---|
| 4,390,595 | 6/1983 | Yamagishi | 428/446 |
| 4,853,286 | 8/1989 | Narimatsu et al. | 428/343 |
| 5,233,464 | 8/1993 | Costich | 359/359 |
| 5,276,693 | 1/1994 | Long et al. | 372/6 |
| 5,425,983 | 6/1995 | Propst et al. | 428/216 |
| 5,463,223 | 10/1995 | Wong et al. | 250/339.12 |
| 5,532,048 | 7/1996 | Klocek et al. | 428/215 |

*Primary Examiner*—Paul J. Thibodeau
*Assistant Examiner*—Holly C. Rickman
*Attorney, Agent, or Firm*—Leonard A. Alkov; William C. Schubert; Glenn H. Lenzen, Jr.

[57] ABSTRACT

Low-cost composite infrared windows that are transparent to long wave infrared radiation (8–12 microns) that provide sufficient strength and impact resistance for automotive-type environments, and the like. The windows may be used with night vision systems for automobiles, surveillance imaging systems, and other applications requiring low cost, long wave infrared windows. In one embodiment, the composite infrared window is a sandwich comprised of a polyethylene plastic film bonded with an acrylic adhesive to a relatively thin (0.015–0.040 inch) silicon substrate. The thin silicon substrate is mechanically stiff and low cost, and transmits in the 8–12 micron bandpass. The thin (0.001–0.007 inch) plastic film provides an exterior particle impact absorbing layer sufficient to enable the use of the window in automotive applications. In another embodiment, the infrared window is a dual pane, long wave infrared transmitting window comprising a thin, antireflection coated, silicon window and a plain or reinforced, embossed, plastic window that may be mounted in a frame.

11 Claims, 2 Drawing Sheets

FIG. 1.
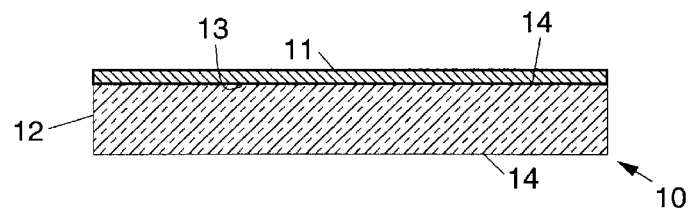
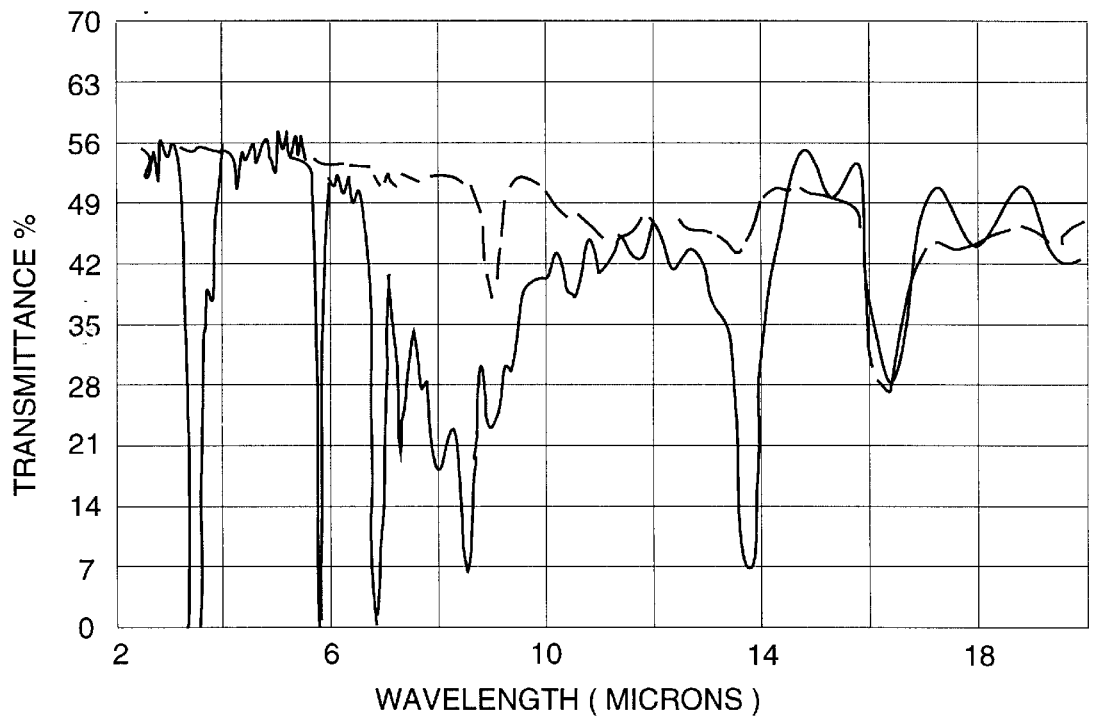
FIG. 2.
FIG. 3.     FIG. 4.
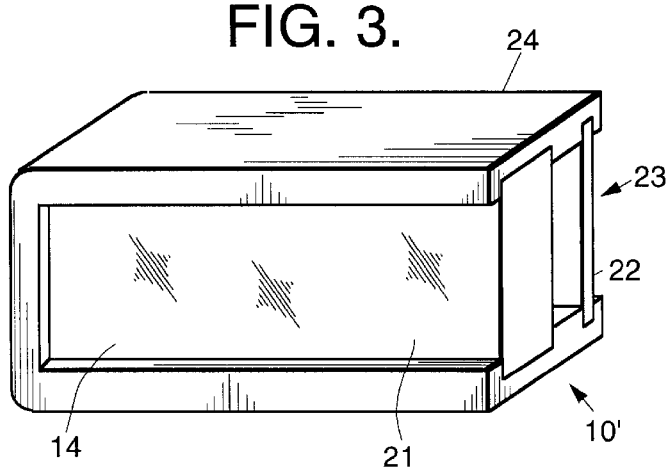
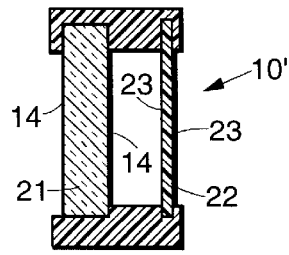

COMPOSITE INFRARED WINDOWS USING SILICON AND PLASTIC

BACKGROUND

The present invention relates generally to infrared windows, and more particularly, to composite infrared windows comprised of silicon and plastic that may be used with infrared sensors of infrared imaging systems.

The prior art relating to infrared windows used in infrared sensors of infrared imaging systems, for example, involves the use of an antireflection-coated germanium or zinc sulfide window as an external window for the sensor or system. Zinc selenide has also found use as a window material for use in more benign environments. All three of these materials are very high cost ceramic materials produced by casting them from a melt of high purity zone, refined, high-cost raw material (germanium) or chemical vapor deposition (zinc sulfide and zinc selenide). Both of these fabrication processes are also relatively expensive.

A thin silicon substrate alone is fragile and would fracture if large particles, such as rocks, for example, impact it. A thin plastic window alone would not be adequately stiff or strong enough to survive commercial automotive environments, for example. Thicker sections of either material would absorb too much infrared energy to be useful if they were used in an infrared imaging system. Practical windows are limited in thickness to approximately 0.015–0.040 inches. In these thicknesses, the durability is not adequate for automotive or general commercial use. Therefore, plastic films used for infrared sensor protection from water and contaminants can only be used in the most benign environments.

Plastic films adhering to a silicon base could also be used as a window. This improves the durability of the window to impact but the transmission is significantly degraded in the 8–12 micron band by the adhesive layer. Additionally, if the plastic is on an external surface, the window cannot withstand severe abrasion caused by stressing environments or windshield wipers, for example.

Accordingly, it is an objective of the present invention to provide for composite infrared windows comprised of silicon and plastic that may be used with infrared sensors of infrared imaging systems.

SUMMARY OF THE INVENTION

To meet the above and other objectives, the present invention provides for comparatively low-cost composite infrared windows that are transparent to long wave infrared radiation (8–12 microns) and that provide sufficient strength and impact resistance for external automotive-type environments. The present invention may be used with night vision systems for automobiles or surveillance imaging applications and other applications requiring low cost, long wave infrared windows.

In one embodiment, the composite infrared window is a sandwich comprised of a polyethylene plastic film bonded with an acrylic adhesive to a thin (0.015–0.040 inch) silicon substrate. The thin silicon substrate provides a mechanically stiff, low cost substrate transmitting in the 8–12 micron bandpass while the thin (0.001–0.007 inch) plastic provides an exterior particle impact absorbing layer sufficient to enable the use of the window in automotive applications.

In another embodiment, the infrared window is a dual pane, long wave infrared (8–12 microns) transmitting window comprising a thin, antireflection coated, silicon window and a plain or reinforced, embossed, plastic window that may be mounted in a frame. Silicon and plastic films are both highly absorptive in the long wavelength infrared region unless they are used in very thin cross sections. This significantly reduces their resistance to breakage. The present invention provides a low cost, scratch-proof, dual pane window system made of silicon and a plastic film. Damage to the window can result in damage to internal optics of an imaging system. The external surface of the window is silicon, which may be coated with highly durable coatings for abrasion resistance. The internal layer is a plastic film that provides a barrier to internal optics of the imaging system should the silicon window be broken. This embodiment of the present invention thus provides a low cost replacement for expensive germanium or zinc sulfide windows currently used for long wavelength infrared imaging systems.

The present invention provides for a comparatively low cost survivable exterior window that transmits the long wave infrared (8–12 micron) bandpass. This window is an ideal low cost alternative to zinc sulfide and germanium windows currently available for use as an external window of a night vision system developed by the assignee of the present invention for automobiles or surveillance imaging applications. One of the main impediments to the commercial acceptance of vision enhancement systems is their relatively high cost. The use of silicon and plastic composite windows for infrared imaging system provides a window that is significantly less costly than currently available windows.

The window with its durable coating on the external silicon surface is more durable than a polymer or polymer coated window and can withstand cleaning with windshield wipers. The internal reinforced plastic film prevents damage to the internal imaging optics and sensor if the silicon should be fractured by impact (stones or debris). Also, since impacting objects that would damage or break the silicon would also tend to damage or break a germanium or zinc sulfide window, the dual-paned window provides for a low cost replacement.

Furthermore, exterior windows used in automotive imaging systems, for example, will at some time become damaged and eventually require replacement. A lower cost replacement window is beneficial, both to customers and to repair facilities that are required to purchase and stock the windows.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a cross sectional view of a first embodiment of an infrared window in accordance with the present invention;

FIG. 2 is a graph showing the measured optical performance of the infrared window of FIG. 1; and FIG. 3 is a perspective view of a second embodiment of an infrared window in accordance with the present invention;

FIG. 4 is a cross sectional view of the infrared window of FIG. 3;

DETAILED DESCRIPTION

Figure 5:
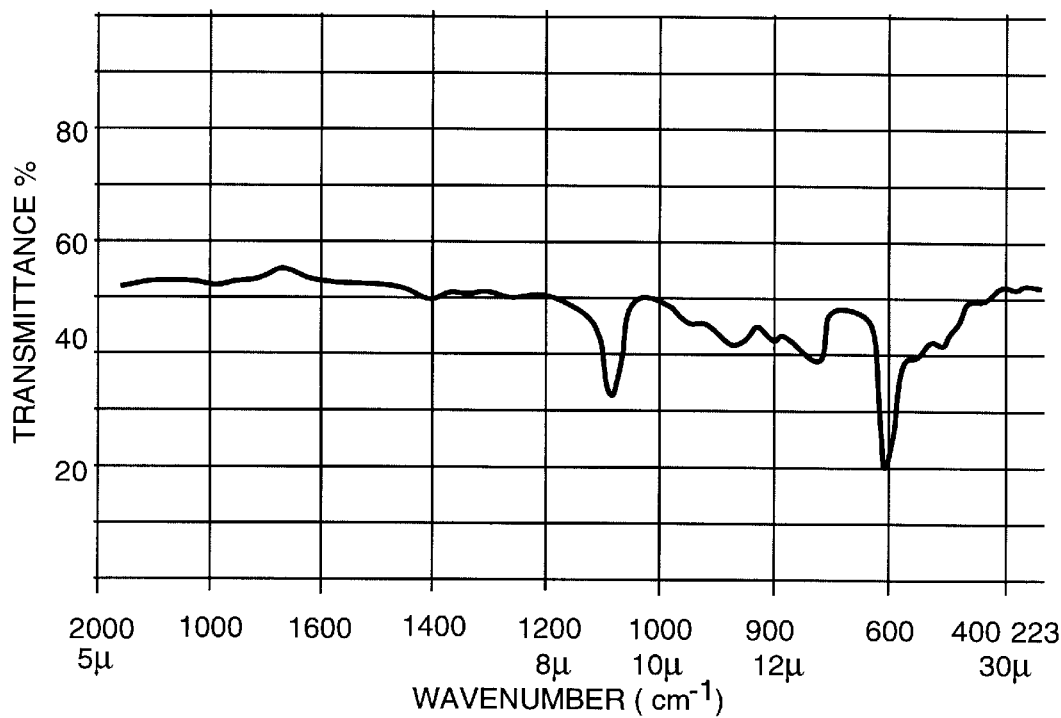
FIG. 5 is a graph illustrating the optical transmission of a one millimeter thick piece of optical grade silicon employed in the infrared window of FIG. 3.

Referring to the drawing figures, FIG. 1 is a cross sectional view of a first embodiment of an infrared window 10 in accordance with the present invention. The invention is a composite infrared window 10 comprised of a thin film 11 (0.001–0.007 inches) of polyethylene plastic bonded with an acrylic bonding material 13 or adhesive 13 to a relatively thin (0.5–1.0 mm) silicon substrate 12.

As was discussed in the Background section, the thin silicon substrate 12, if used alone, would be fractured if it was impacted by large particles. The thin plastic window 10, if used alone, would provide for a structure that is not adequately stiff or strong enough to survive impacting environments. Thicker sections of either material would absorb too much infrared energy to be useful for an infrared imaging system. The above-described embodiment of the present invention integrates these materials into an infrared window 10 that overcomes these deficiencies.

A prototype of the infrared window 10 was fabricated. This infrared window 10 was fabricated using a 0.005 inch thick polyethylene plastic film 11 bonded with an acrylic adhesive 13 to a thin (0.75 mm) silicon window 10. The measured spectral transmission of this prototype infrared window 10 is shown in FIG. 2.

The prototype infrared window 10 transmits approximately 33 percent average in the long wave infrared bandpass (8.5–12.5 microns). However, much of the loss in transmission arises from reflection from exterior surfaces of the infrared window 10. In fact, bare silicon with no absorption only transmits approximately 56 percent average in this bandpass.

These reflection losses may be reduced using antireflection coatings 14 deposited onto the surfaces of the silicon substrate 12. In addition, the surface of the plastic film 11 may be embossed to reduce the reflection (approximately 10 percent) that occurs due to that surface. Antireflection coatings 14 may be used to grade the refractive index between the silicon substrate 12 and plastic film 11, further reducing reflection losses.

The layer of acrylic bonding material 13 accounts for over 20 percent of the absorption due to the infrared window 10 in the long wavelength infrared region. Use of more transparent adhesive materials improves the overall transmission performance of the infrared window 10.

Furthermore, the silicon used in the prototype infrared window 10 was Czochralski grown silicon, which inherently contains a relatively high concentration of oxygen, manifested as an absorption peak at 9 microns. Use of float zone silicon for the silicon substrate 12, which inherently has practically no oxygen concentration, would eliminate the large absorption band at 9 microns shown in FIG. 2.

The plastic film 11 may be bonded to the exterior surface of the silicon substrate 12, so that in the event the window 10 is impacted with sharp objects, the plastic film 11 will deform and absorb the impact, thus preventing window fracture. Alternatively, the plastic film 11 may be bonded to the interior surface of the silicon substrate 12, so that in the event that the window 10 is broken, pieces of the window 10 would remain held together by the plastic film 11, and therefore would be prevented from falling into a sensor and damaging it. Also, the seal to the exterior environment would be maintained, facilitating repair. The advantage of placing the plastic film 11 on the inside surface would be to utilize the scratch resistance of the silicon silicon substrate 12 and antireflection coating 14, enabling a windshield wiper cleaning system to contact it in addition to preventing compromise of the interior of the imaging system.

The second embodiment of the present invention is shown in FIGS. 3 and 4. FIG. 3 is a perspective view of a dual pane infrared window 10' while FIG. 4 is a cross sectional view of the dual pane infrared window 10'. This dual pane infrared window 10' has an exterior window 21 comprised of a polished wafer 21 of optical grade silicon, 0.040 inches thick that is coated with a durable antireflection coating 14 disposed on an exterior surface thereof and a high efficiency antireflection coating 14 on an interior surface thereof. The interior window 22 is a thin plastic film 22, approximately 0.002–0.010 inches thick, embossed on both sides with an index matching pattern 23 to improve transmission. Both elements may be constrained in a molded plastic frame 24, for example.

The silicon wafer 21 is used as the external window of the dual pane infrared window 10'. The silicon wafer 21 may be coated with the durable antireflection coating 14 to provide abrasion resistance, enabling a windshield wiper cleaning system to contact it. The internally embossed plastic film 22 protects internal optics should the silicon wafer 21 be broken. This minimizes the possibility of damage to internal optics, and reduces the cost of repairing the infrared sensor protected by the infrared window 10' by limiting it to replacement of the window 10'.

The transmission of the dual pane infrared window 10' is estimated to be approximately 80 percent in the 8–12 micron band. FIG. 5 shows a representative transmission curve for a 0.040 inch thick piece of silicon. When coated with high efficiency antireflection coatings 14, one side of which could contain hard carbon, for example, the average transmission may be increased from approximately 40% in the 8–12 micron band to approximately 90 percent. The use of float zone silicon further improves transmission by eliminating the absorption band at 9 microns, but this also increases the cost of the window 10'.

Figure 6:
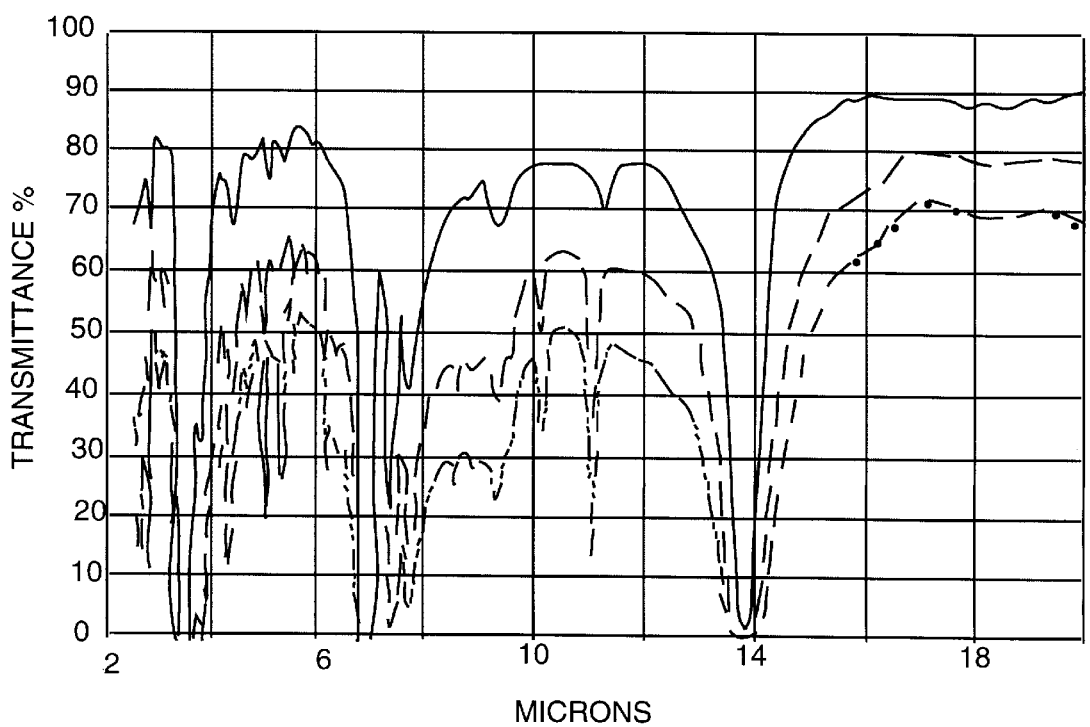
FIG. 6 is a graph illustrating the optical transmission of a 0.006 inch thick piece of plastic film employed in the infrared window of FIG. 3.

FIG. 6 shows the transmission of a 0.006 micron thick plastic film sample (top curve) without the index matching pattern 23 embossed on it. Measurements made on 0.004 inches thick plastic films 22, embossed with index matching patterns 23 have average transmissions in the 8–12 micron band of greater than 90 percent. Multiplying the transmission curves of the two elements yields a composite transmission of approximately 80 percent.

Thus, there have been disclosed composite infrared windows comprised of silicon and plastic that may be used for infrared imaging applications. It is to be understood that the described embodiments are merely illustrative of some of the many specific embodiments which represent applications of the principles of the present invention. Clearly, numerous other arrangements can be readily devised by those skilled in the art without departing from the scope of the invention.

What is claimed is:

1. A composite infrared window comprising:

a silicon substrate having a first surface and a second surface;

a first antireflection coating on the first surface of the silicon substrate;

a second antireflection coating on the second surface of the silicon substrate;

an infrared-transmissive plastic film having a surface embossed to reduce reflection therefrom; and an adhesive disposed between the first antireflection coating and the plastic film and bonding them together.

2. The window of claim 1 wherein the plastic film comprises a polyethylene film.

3. The window of claim 1 wherein the silicon substrate has a thickness between 0.015 and 0.040 inches.

4. The window of claim 3 wherein the adhesive comprises an acrylic adhesive.

5. The window of claim 1 wherein at least one of the antireflection coatings is used to grade the refractive index between the silicon window and the plastic film.

6. The window of claim 1 wherein the silicon substrate comprises float zone silicon.

7. A composite infrared window comprising:

a first window segment comprising a polished silicon wafer;

a first antireflection coating disposed on a first surface of the first window segment;

a second antireflection coating disposed on a second surface of the first window segment;

a second window segment comprising an infrared-transmissive plastic film said second window segment being embossed on both sides; and a frame for holding the first window segment and the second window segment such that the second window segment overlies but does not contact the first window segment.

8. The window of claim 7 wherein the silicon substrate comprises optical grade silicon.

9. The window of claim 7 wherein the silicon substrate comprises float zone silicon.

10. The window of claim 7 wherein the second window segment is approximately 0.002–0.010 inches thick.

11. The window of claim 7 wherein the polished wafer of silicon is between 0.015 and 0.040 inches thick.

\* \* \* \* \*